United States Patent

Schellenberg

[15] 3,683,115

[45] Aug. 8, 1972

[54] ARRANGEMENT TO SUPERVISE THE OPERATION OF CODER AND DECODER CIRCUITS IN A PCM-TDM SYSTEM

[72] Inventor: Arnold Albert Schellenberg, Wettswil, Switzerland

[73] Assignee: International Standard Electric Corporation, New York, N.Y.

[22] Filed: July 15, 1969

[21] Appl. No.: 841,762

[30] Foreign Application Priority Data

Aug. 12, 1968 Switzerland .............12080/68

[52] U.S. Cl. ..............................................179/15 BF

[51] Int. Cl. ...............................................H04j 3/14

[58] Field of Search..........179/15 BF, 15 AP, 15 BY; 340/146.1; 325/13, 31, 4

[56] References Cited

UNITED STATES PATENTS

| | | | |
|---|---|---|---|
| 3,428,898 | 2/1969 | Jacobsen | .......................325/4 |
| 2,945,915 | 7/1960 | Strip | ....................340/146.1 E |
| 3,112,370 | 11/1963 | Longton | ...................179/15 T |
| 3,259,695 | 7/1966 | Murakami | ................179/15 T |

*Primary Examiner*—Ralph D. Blakeslee
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

The coder and decoder of a terminal are placed in a closed loop excluded from the normal transmission lines during sync time and/or signalling time. During this time a low frequency test signal is applied to the coder and a comparison circuit. By gate means the output of the coder is directly coupled to the decoder of the same terminal. The output of the decoder is coupled to the comparison circuit. The comparison circuit will produce a fault indication when the difference between the two input signals applied thereto exceeds a predetermined amount. Continuous supervision over the whole range of the coder and decoder, without influencing the intelligence paths, is possible provided the waveform and frequency of the test signal is properly chosen.

10 Claims, 1 Drawing Figure

PATENTED AUG 8 1972 3,683,115
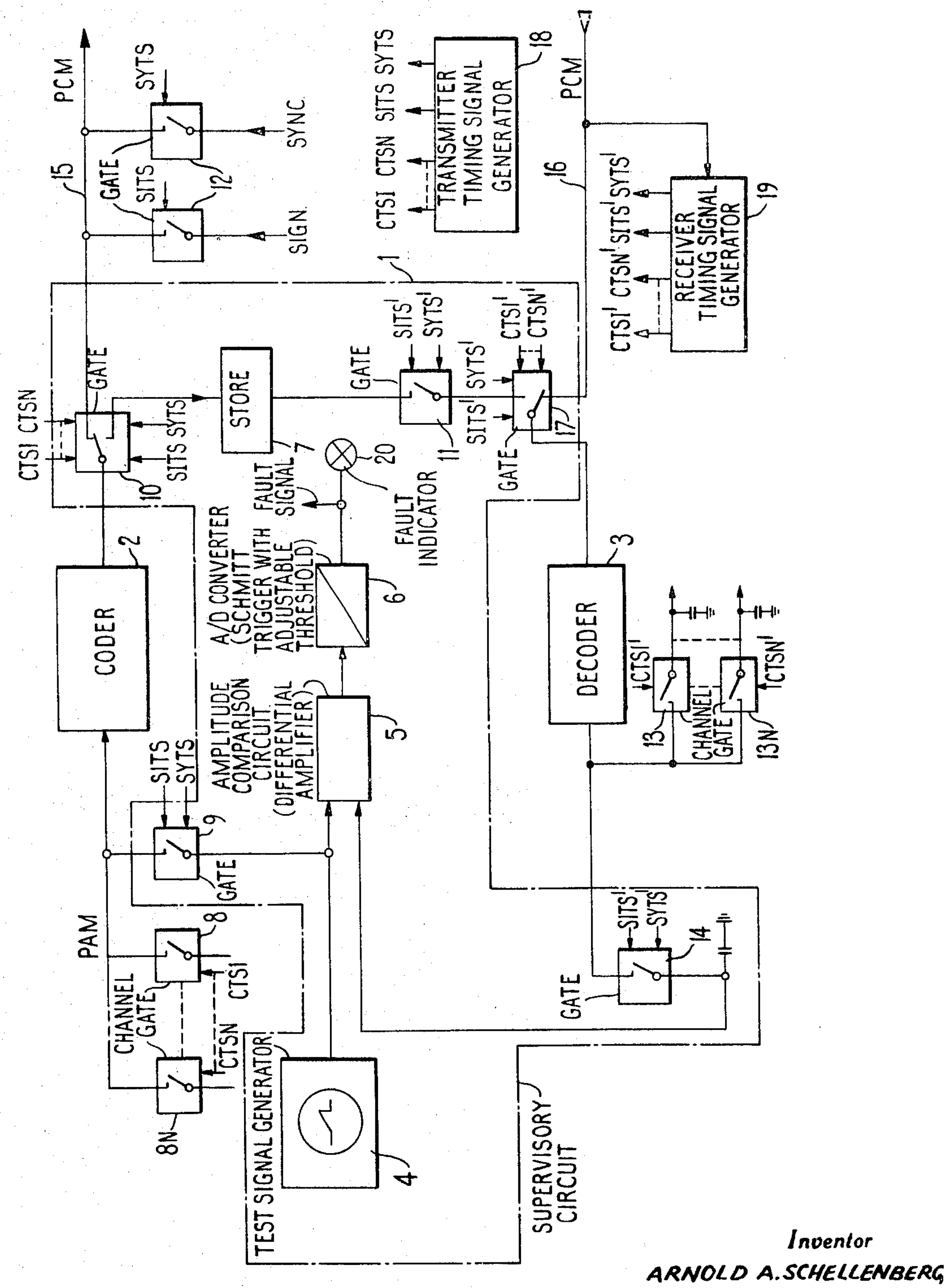
*Inventor*
ARNOLD A. SCHELLENBERG
By Alfred C. Hill
*Agent*

ARRANGEMENT TO SUPERVISE THE OPERATION OF CODER AND DECODER CIRCUITS IN A PCM-TDM SYSTEM

BACKGROUND OF THE INVENTION

The present invention relates to PCM-TDM (pulse code modulation-time division multiplex) systems and more particularly to a method and an arrangement to carry out the method of supervising the operation of coder and decoder circuits in a PCM-TDM system.

In PCM systems the correct operation of the transmission line and the repeater and terminal amplifiers connected in series thereto can easily and continuously be tested, e.g., by supervising (monitoring) the synchronization signal received over said line. Since the synchronization signal is fed into the transmission line after the coder and extracted from the transmission line before the decoder, the operation of the coder and the decoder is not supervised by supervising the synchronization signal.

Several methods are known for supervising the operation of coder and decoder circuits. In all known methods a test signal is applied to the coder, coded therein, transmitted to the decoder at the remote terminal through the transmission line, decoded by the decoder and applied to an evaluation circuit. These methods differ from one another mainly by the manner by which the test signal is inserted into the intelligence signal. Methods are known wherein a time slot of the TDM system is reserved for the supervision so that one channel is lost for the intelligence transmission. Other systems use also a predetermined channel of the TDM system for the supervision, but the supervision is only performed when this channel is not seized for speech transmission. Other methods use an optional channel not seized for speech transmission whereby the remote terminal must be informed of the number of the channel used for the supervision at this moment. The two last named methods have the disadvantage that normal speech channels are influenced and that the supervision cannot continuously be performed. All said methods have the disadvantage that upon the presence of a fault it isn't clear forthwith if the fault is in the equipment of the near terminal, or in that of the remote terminal. For integrated transmission and switching systems, the test signal must be decoded at each switching station and then be coded again. A fault indication at a terminal can indicate both an incorrect switching and a defective coder or decoder.

SUMMARY OF THE INVENTION

It is, therefore, an object of the present invention to provide a supervisory method and arrangement to carry out this method avoiding the above mentioned disadvantages.

A feature of the present invention is the provision of an arrangement to supervise the operation of a coder and decoder in one terminal of a PTM-TDM system having a multiplex signal including a plurality of channel time slots, a synchronization time slot and a signalling time slot comprising a test signal generator; first means coupled to the generator and the coder to couple the test signal to the input of the coder during at least one of the synchronization and signalling time slots; second means coupled to the coder and the decoder to couple the output signal of the coder to the input of said decoder during the one of the synchronization and signalling time slots; and third means coupled to the generator and the output of the decoder during the one of the synchronization and signalling time slots to produce a fault indication when the amplitude of the difference between the amplitude of the test signal and the amplitude of the output signal of the decoder exceeds a predetermined amplitude.

BRIEF DESCRIPTION OF THE DRAWING

The above-mentioned and other features and objects of this invention and the manner of obtaining them will become more apparent by reference to the following taken in conjunction with the drawing, the single FIGURE of which illustrates a simplified block diagram of a terminal station of a PCM-TDM system including the elements required for the supervision arrangement according to the principles of the present invention.

DESCRIPTION OF THE PREFERRED EMBODIMENT

The terminal station shown in the drawing is arranged for N=30 intelligence channels, one synchronization channel and one signalling channel and comprises supervisory circuit 1, within the dotted line, coder 2 for the outgoing (transmitted) multiplex signal, decoder 3 for the incoming (received) multiplex signal, channel gates 8 to 8N and 13 to 13N, gates 12 for inserting signalling and synchronization signals into the multiplex signal prior to transmission thereof, and two transmission lines 15 and 16.

Gates 8 to 8N are closed in sequence by the channel gate timing signals CTS1 to CTSN generated in transmitter timing signal generator 18 from, for instance, a master crystal controlled oscillator and a delay line coupled thereto to produce the sequence of properly timed transmitter channel gate signals.

Gates 13 to 13N are closed in sequence by the channel gate timing signals CTS1' to CTSN' generated in receiver timing signal generator 19 from, for instance, a local oscillator synchronized to the received multiplex signal and a delay line coupled thereto to produce the sequence of properly timed receiver channel gate signals.

Supervisory circuit 1 comprises function or test signal generator 4, amplitude comparison circuit 5, analog-to-digital converter 6, store 7 and gates 9, 10, 11, 14 and 17. Generator 4 produces a low frequency periodic or aperiodic test signal of any desired waveform which is applied to the comparison circuit 5 and gate circuit 9.

Gate 10 is activated by channel gate signals CTS1 to CTSN to be maintained in the illustrated position to couple the coded intelligence channel signal output of coder 2 to transmission line 15. Gate 10 is activated to be placed in its other position by signalling timing signal SITS and/or synchronization timing signal SYTS, both of these timing signals being generated in generator 18.

Gate 17 is activated by channel gate signals CTS1' to CTSN to be maintained in the illustrated position to couple the coded intelligence channel signal from transmission line 16 to the input of decoder 3. Gate 17 is activated to be placed in its other position by signalling timing signal SITS' and/or synchronization timing signal SYTS', both of these timing signals being generated in Generator 19.

Gate 9 is closed by timing signal SITS and/or SYTS and gates 11 and 14 are closed by timing signal SITS' and/or SYTS'. applies Since both the signalling and the synchronization signals are fed directly into transmission line 15 during a time slot reserved for these signals, coder 2 is not used during said two time slots. During at least one of said time slots, the test signal from generator 4 is applied to coder 2 with the aid of gate circuit 9. Gate circuit 10 disconnects simultaneously the output of coder 2 from the transmission line 15 and applied it to store 7 which is necessary for the non-synchronous operation of the coder and the decoder of one terminal station because the time slots used in the coder and the decoder for signalling or synchronization purposes are not coincident with one another in this case. With the aid of gate circuits 11 and 17 the test signal coded by coder 2 is applied to decoder 3, decoded therein and applied to comparison circuit 5 with the aid of gate circuit 14.

Comparison circuit 5 which, for instance, is a differential amplifier, applies, with unequal input signals at its two inputs, an output signal proportional to the amplitude difference of these two input signals to analog-to-digital converter 6 which, for instance, is a Schmitt trigger circuit having an adjustable threshold level. The trigger circuit will be triggered when the amplitude difference exceeds the threshold level resulting in an output signal that will provide a fault indication, such as by means of lamp 20.

From the above it may be seen that the coder for one transmission direction and the decoder for the other transmission direction are tested in a closed loop avoiding the transmission lines. This is allowed without further consequences since the transmission lines may be supervised in other manners as already mentioned and shows the advantage that by the separate test of the coder/decoder and the transmission lines the fault location is simplified.

By a suitable choice of the waveform and the frequency of the test signal, the coder and decoder circuits can continuously be supervised over the whole range of their working characteristics.

While I have described above the principles of my invention in connection with specific apparatus, it is to be clearly understood that this description is made only by way of example.

I claim:

1. An arrangement to supervise the operation of a coder and a decoder in one terminal of a pulse code modulation-time division multiplex system having a multiplex signal including a plurality of channel time slots, a synchronization time slot and a signalling time slot comprising:

a test signal generator;

first means coupled to said generator and said coder to couple said test signal to the input of said coder during at least one of said synchronization and signalling time slots;

second means coupled to said coder and said decoder to couple the output signal of said coder to the input of said decoder during said one of said synchronization and said signalling time slots; and third means coupled to said generator and the output of said decoder during said one of said synchronization and said signalling time slots to produce a fault indication when the amplitude of the difference between the amplitude of said test signal and the amplitude of the output signal of said decoder exceeds a predetermined amplitude.

2. An arrangement according to claim 1, wherein each of said first and second means includes switch means closed during said one of said synchronization and signalling time slots.

3. An arrangement according to claim 1, wherein said second means includes a first gate means coupled to the output of said coder closed during said one of said synchronization and said signalling time slots in the transmitting portion of said terminal, storage means coupled to the output of said first gate means, and a second gate means coupled to the output of said storage means and the input of said decoder during said one of said synchronization and said signalling time slots in the receiving portion of said terminal.

4. An arrangement according to claim 1, wherein said third means includes fourth means coupled to said decoder and said generator to produce a control signal proportional to the difference between the amplitude of said test signal and the amplitude of the output signal of said decoder, and fifth means coupled to said fourth means to produce said fault indication when the amplitude of said control signal exceeds a predetermined amplitude.

5. An arrangement according to claim 4, wherein said fourth means includes an amplitude comparison circuit.

6. An arrangement according to claim 5, said comparison circuit includes a differential amplifier.

7. An arrangement according to claim 4, wherein said fifth means includes an analog-to-digital converter having a threshold level equal to said predetermined amplitude.

8. An arrangement according to claim 7, wherein said converter includes

A Schmitt trigger circuit having a threshold level adjusted to said predetermined amplitude.

9. An arrangement according to claim 4, wherein said fourth means includes an amplitude comparison circuit; and said fifth means includes an analog-to-digital converter having a threshold level equal to said predetermined amplitude.

10. An arrangement according to claim 9, wherein said first means includes first switch means coupled to said generator and the input of said coder and closed during said one of said synchronization and signalling time slots, in the transmitting portion of said terminal;

said second means includes second switch means coupled to the output of said coder and closed during said one of said synchronization and signalling time slots in the transmitting portion of said terminal, storage means coupled to the output of said second switch means, and third switch means coupled to the output of said storage means and the input of said decoder during said one of said synchronization and signalling time slots in the receiving portion of said terminal;

said comparison circuit includes a differential amplifier; and said converter includes a Schmitt trigger circuit having a threshold level adjusted to said predetermined amplitude.

* * * * *